United States Patent
Chen et al.

(10) Patent No.: US 8,117,432 B2
(45) Date of Patent: Feb. 14, 2012

(54) METHOD FOR CONTROLLING BOOT SEQUENCE OF SERVER

(75) Inventors: Long Chen, Tianjin (CN); Tom Chen, Taipei (TW)

(73) Assignee: Inventec Corp., Taipei (TW)

( * ) Notice: Subject to any disclaimer, the term of this patent is extended or adjusted under 35 U.S.C. 154(b) by 559 days.

(21) Appl. No.: 12/267,349

(22) Filed: Nov. 7, 2008

(65) Prior Publication Data

US 2010/0122075 A1 May 13, 2010

(51) Int. Cl.
G06F 9/00 (2006.01)
G06F 11/00 (2006.01)

(52) U.S. Cl. .............................. 713/2; 714/36

(58) Field of Classification Search .......... 713/1, 2; 714/36, E11.15
See application file for complete search history.

(56) References Cited

U.S. PATENT DOCUMENTS

| | | | |
|---|---|---|---|
| 6,625,754 B1* | 9/2003 | Aguilar et al. | 714/15 |
| 2001/0052069 A1* | 12/2001 | Sekiguchi | 713/2 |
| 2003/0126242 A1* | 7/2003 | Chang | 709/222 |
| 2005/0198629 A1* | 9/2005 | Vishwanath | 717/174 |
| 2008/0046548 A1* | 2/2008 | Doran et al. | 709/222 |
| 2008/0082809 A1* | 4/2008 | Rothman et al. | 713/1 |
| 2008/0091929 A1* | 4/2008 | Oberhaus et al. | 713/1 |
| 2008/0263349 A1* | 10/2008 | Ota et al. | 713/2 |

* cited by examiner

*Primary Examiner* — Thomas Lee
*Assistant Examiner* — Phil Nguyen
(74) *Attorney, Agent, or Firm* — James W. Huffman

(57) ABSTRACT

A method for controlling a boot sequence of a server includes the following steps. A boot image is created, and a first proxy server program is placed into the boot image. The first proxy server program communicates with a management server. The boot image is restored on a rewritable removable storage device, so as to enable the rewritable removable storage device to boot a managed target server. A second proxy server program is installed and executed in the management server. A basic input/output system (BIOS) of the target server is set to enable the rewritable removable storage device to act as a first boot device. Boot files in the rewritable removable storage device are modified through the first proxy server program or the second proxy server program according to a boot instruction received from the management server, thereby controlling a boot sequence of the target server.

7 Claims, 4 Drawing Sheets

METHOD FOR CONTROLLING BOOT SEQUENCE OF SERVER

BACKGROUND OF THE INVENTION

1. Field of the Invention

The present invention relates to a method for controlling a boot sequence of a server, and more particularly to a method for controlling a boot sequence of a server by a rewritable removable storage device.

2. Related Art

Currently, with the rapid development and popularization of network technologies, networks have become the first tool for the masses to acquire information and make communications in daily work and life. In the networks, servers can offer various services to clients (for example, allowing or restricting the access to shared resources, automatically backing up data, and accessing operating data from remote computers).

In the server management field (In the field of server management), in some cases, management software may request the target server to perform a network boot via a pre-boot execution environment (PXE) or virtual media, so as to complete certain specific management operations. In order to boot a server with network, a variety of solutions have been developed for controlling the boot sequence of the server. The PXE, as an extension of a remote program load (RPL) technology among the network technologies, is used to start up a computer from a remote server and using a remote system in the case that no startup system is configured or even no hard disk is configured, which can also install system or applications via a remote server.

There are mainly the following several conventional methods for controlling a boot sequence of a server.

In a first solution, a target server is set, such that a default status of a network card is "Enabled", so as to determine whether to boot the target server from the PXE or not by controlling a PXE server program.

In a second solution, the boot sequence is altered in an operating system through a utility program provided by a basic input/output system (BIOS) of the target server.

In a third solution, the boot sequence of the BIOS of the server is controlled by a management chip such as a baseboard management controller (BMC).

In a fourth solution, the boot sequence of the server is changed by controlling remote ISO files for virtual media.

However, among the above four solutions, the defect of the first solution lies in that the PXE server program needs to be completely controlled, and the defects of the second solution, the third solution, and the fourth solution lie in high hardware requirements.

To sum up, the solutions in the prior art have the following defects. Firstly, the cost is increased due to the high hardware requirements. Secondly, the reliability is reduced since the hardware and operating system of the server need to be modified. Thirdly, the solutions are rather complex and inconvenient to implement.

SUMMARY OF THE INVENTION

Accordingly, in order to solve the above problems and defects in the prior art, the present invention is directed to a method for controlling a boot sequence of a server, in which the boot sequence of the server is controlled by a rewritable removable storage device.

A method for controlling a boot sequence of a server provided in the present invention is suitable for a management server to control a boot sequence of a target server by a rewritable removable storage device. The method includes the following steps. Creating a boot image for booting an operating system of the target server and placing a first proxy server program which is used to communicate with a management server into the boot image; restoring the boot image containing the first proxy server program on a rewritable removable storage device, so that the rewritable removable storage device which has the boot image is enabled to boot the target server in the sequence steps; installing and executing a second proxy server program in an operating system of the target server booted from a hard disk, wherein the second proxy server program is used to communicate with the management server; setting a basic input/output system (BIOS) of the target server, wherein the target server selects to be booted from the rewritable removable storage device first, and if the booting operation from the rewritable removable storage device fails, the target server is then booted from a hard disk thereof; and modifying the boot files in the portable storage according the enable instruction from the management server by the first proxy server program and the second proxy server program, so as to select to boot the target server from the rewritable removable storage device or from the hard disk of the target server when the target server is booted next time. (A boot image for booting an operating system of the target server is created, and a first proxy server program is placed into the boot image. The first proxy server program is used to communicate with the management server. The boot image containing the first proxy server program is restored on a rewritable removable storage device, so that the rewritable removable storage device is enabled to boot the target server. A second proxy server program is installed and executed in an operating system of the target server booted from a hard disk. The second proxy server program is used to communicate with the management server. A basic input/output system (BIOS) of the target server is set, so that the target server selects to be booted from the rewritable removable storage device first, and if the booting operation from the rewritable removable storage device fails, the target server is then booted from a hard disk thereof. The first proxy server program or the second proxy server program modifies boot files in the rewritable removable storage device according to a boot instruction received from the management server, so as to select to boot the target server from the rewritable removable storage device or from the hard disk of the target server when the target server is booted next time.)

To sum up, the present invention has the following advantages. Firstly, as for the hardware configuration, the method for controlling a boot sequence of a server of the present invention merely needs a rewritable removable storage device, without any other hardware, thereby reducing the cost. Secondly, the method of the present invention does not need to modify the hardware and the operating system of the target server, so that the method of the present invention is highly reliable. Thirdly, the method of the present invention is much simpler and more convenient, as compared with various conventional methods.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Preferred embodiments of the present invention will be described in detail below with reference to the drawings.

Figure 1A:
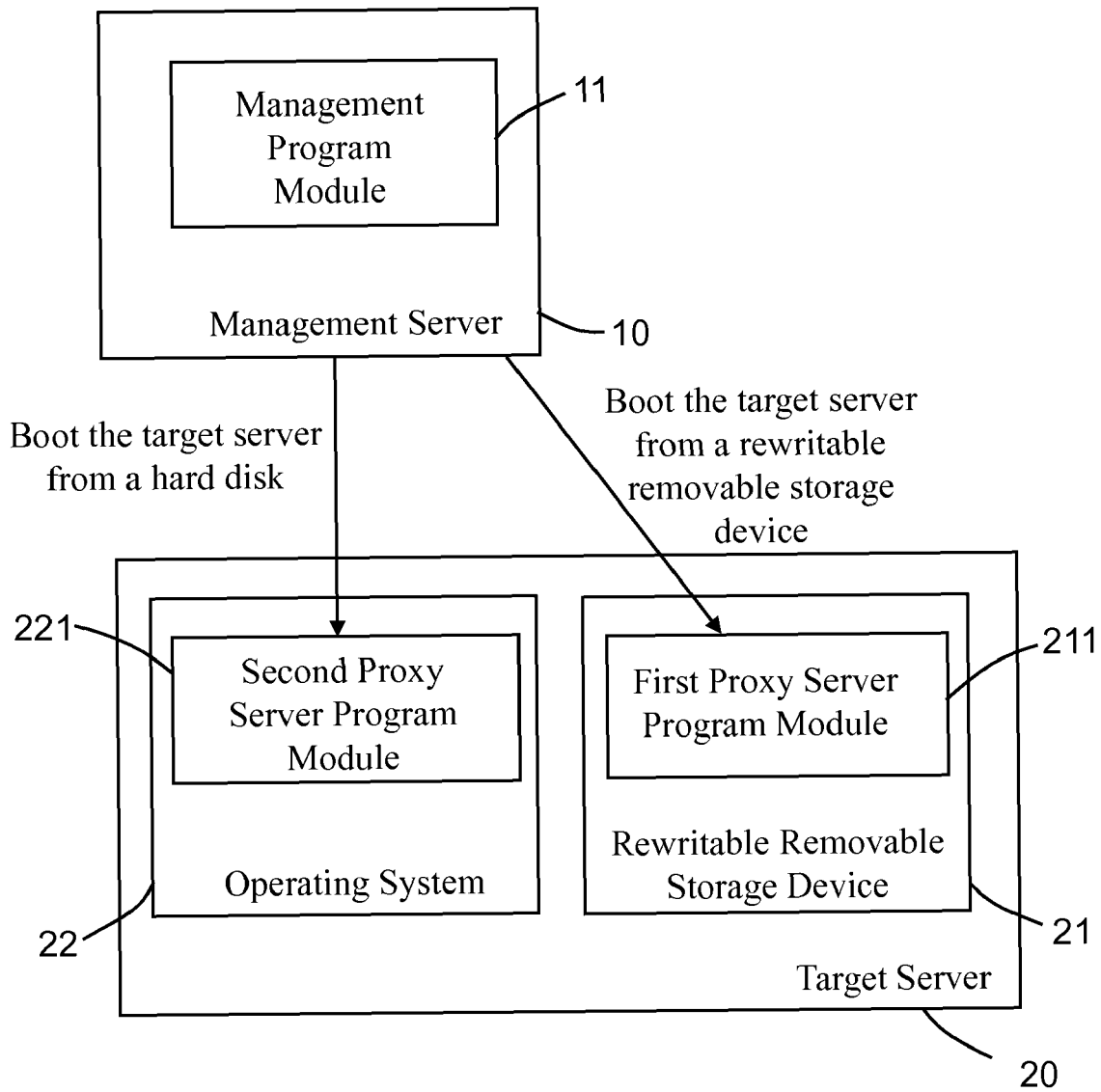
FIG. 1A is an architectural diagram of a system for implementing a method for controlling a boot sequence of a server according to an embodiment of the present invention.

FIG. 1A is an architectural diagram of a system for implementing a method for controlling a boot sequence of a server according to an embodiment of the present invention. Referring to FIG. 1, the system includes a management server 10 and a target server 20.

The management server 10 includes a management program module 11. The management program module 11 is used to send a boot instruction to the target server. The boot instruction is used to select to boot the target server 20 from a hard disk or from a rewritable removable storage device 21 when the target server is booted next time.

Herein, the rewritable removable storage device 21 includes a first proxy server program module 211 used to communicate with the management server 10. Meanwhile, an operating system 22 of the target server 20 includes a second proxy server program module 221 used to communicate with the management server 10, similar to the first proxy server program module 211. The management server 10 performs a remote control over the target server 20 via the first proxy server program module 211 and the second proxy server program module 221, thereby controlling the boot sequence of the target server 20.

An operating flow of the system shown in FIG. 1A will be described below with reference to FIG. 1B.

Figure 1B:
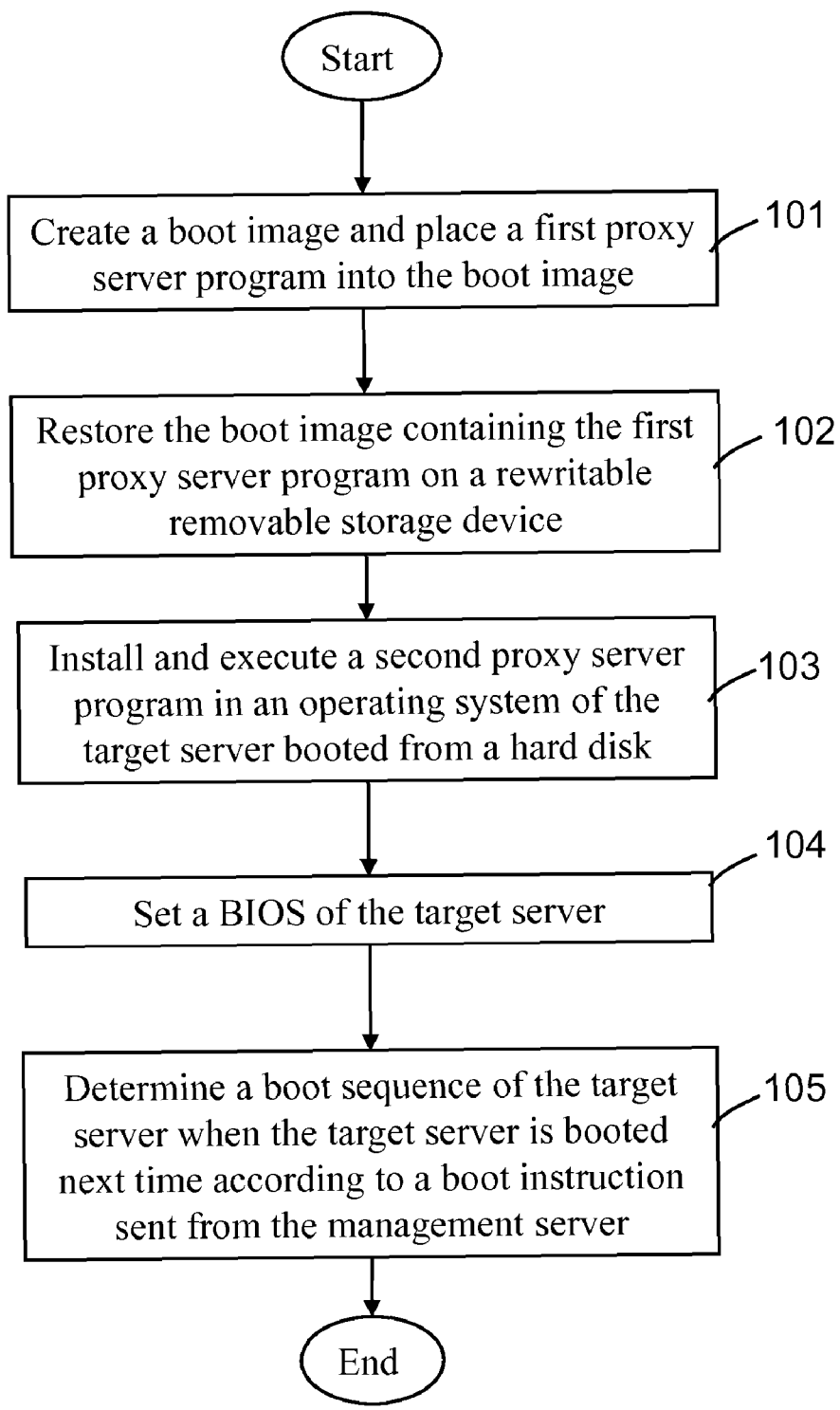
FIG. 1B is a flow chart of a method for controlling a boot sequence of a server according to an embodiment of the present invention.

FIG. 1B is a flow chart of a method for controlling a boot sequence of a server according to an embodiment of the present invention, in which a management server implements an all-round control over a boot sequence of a target server by a rewritable removable storage device, thereby improving the server management modes in the prior art.

Firstly, a boot image is created, and a first proxy server program is placed into the boot image (Step 101). Herein, the boot image is created according to an operating system of the target server such as a Linux system or Windows PE system, such that the target server can be booted from a rewritable removable storage device storing the boot image in the subsequent steps. The first proxy server program can be booted together with the boot image and communicate with the management server, so that the management server performs a remote control over the target server via the first proxy server program. Herein, if it intends to complete certain management operations while booting the operating system of the target server, for example, if it intends to call a system security management program while booting the operating system of the target server, corresponding management applications can also be placed into the boot image.

Next, the boot image containing the first proxy server program is restored on the rewritable removable storage device (Step 102), so that the rewritable removable storage device is enabled to boot the target server. Meanwhile, the management applications previously added in the boot image in Step 101 may also be copied into the rewritable removable storage device.

Herein, the rewritable removable storage device for booting the target server can be easily fabricated. In an embodiment of the present invention, the rewritable removable storage device may serve as an auxiliary element of the target server. Therefore, the original hardware in the target server does not need to be modified during the process of controlling the boot sequence of the server, thereby simplifying the method for controlling the boot sequence of the server.

In addition, the rewritable removable storage device is any one of a rewritable optical disk, a rewritable digital video disk (DVD), and a USB flash device. For example, as for a target server equipped with an optical disk recorder, a rewritable DVD can be taken as the rewritable removable storage device. In order to enable the present invention to have a wider application scope, the rewritable removable storage device used in the preferred embodiments of the present invention is a USB flash device. Since a USB interface is the most fundamental configuration requirement for a server, the USB flash device can further reduce the hardware configuration requirement for the server in the method for controlling a boot sequence of a server according to the embodiments of the present invention.

Afterwards, a second proxy server program is installed and executed in an operating system of the target server booted from a hard disk (Step 103). The second proxy server program is used to communicate with the management server, so that the management server can perform a remote control over the target server via the second proxy server program.

The above first proxy server program and the second proxy server program may respectively perform a write operation on the rewritable removable storage device. In the subsequent steps, the first proxy server program or the second proxy server program performs a write operation on the rewritable removable storage device, so that the rewritable removable storage device is enabled to boot the target server or is disabled to boot the target server, thereby controlling the boot sequence of the target server.

Moreover, the first proxy server program and the second proxy server program may directly communicate with the management server, or communicate with the management server after an IP address of the management server is input.

After the first proxy server program and the second proxy server program communicate with the management server, the first proxy server program or the second proxy server program can complete certain management operations such as calling a certain management application according to an instruction from the management server.

After the rewritable removable storage device is connected to the target server, a basic input/output system (BIOS) of the target server is set (Step 104).

In particular, a boot sequence for the BIOS of the target server needs to be set as preferentially booting from the rewritable removable storage device. Hence, the target server selects to be booted from the rewritable removable storage device first each time when the target server is booted. The reason why the target server is made to select to be booted from the rewritable removable storage device first each time when the target server is booted lies in the principles of the method for controlling a boot sequence of a server according to the embodiment of the present invention, that is, the rewritable removable storage device storing the boot image of the target server must be maintained as the first boot device (or called boot point) for the target server all the time, such that the BIOS automatically searches for the next boot point to boot the operating system, i.e., boot from the hard disk of the target server, only when the boot image stored in the rewritable removable storage device cannot boot the target server, thereby controlling the boot sequence of the target server.

It belongs to the prior art that the BIOS successively searches for other boot points to boot the operating system, if the first boot point fails, and thus the details are no longer described herein.

Moreover, persons skilled in the art should understand that, once the rewritable removable storage device is removed from the target server, the target server is released from the centralized management of the management server and obtains an independent management right.

Finally, a boot sequence of the target server when the target server is booted next time is determined according to a boot instruction sent from the management server (Step 105).

The above first proxy server program or the second proxy server program modifies boot files in the rewritable removable storage device according to the boot instruction, so that the rewritable removable storage device is disabled to boot the target server or enabled to boot the target server, so as to determine whether to boot the target server from the rewritable removable storage device or from the hard disk of the target server when the target server is booted next time, thereby eventually controlling the boot sequence of the target server.

The above Step 105 is described in detail below with reference to FIGS. 2 and 3.

Figure 2:
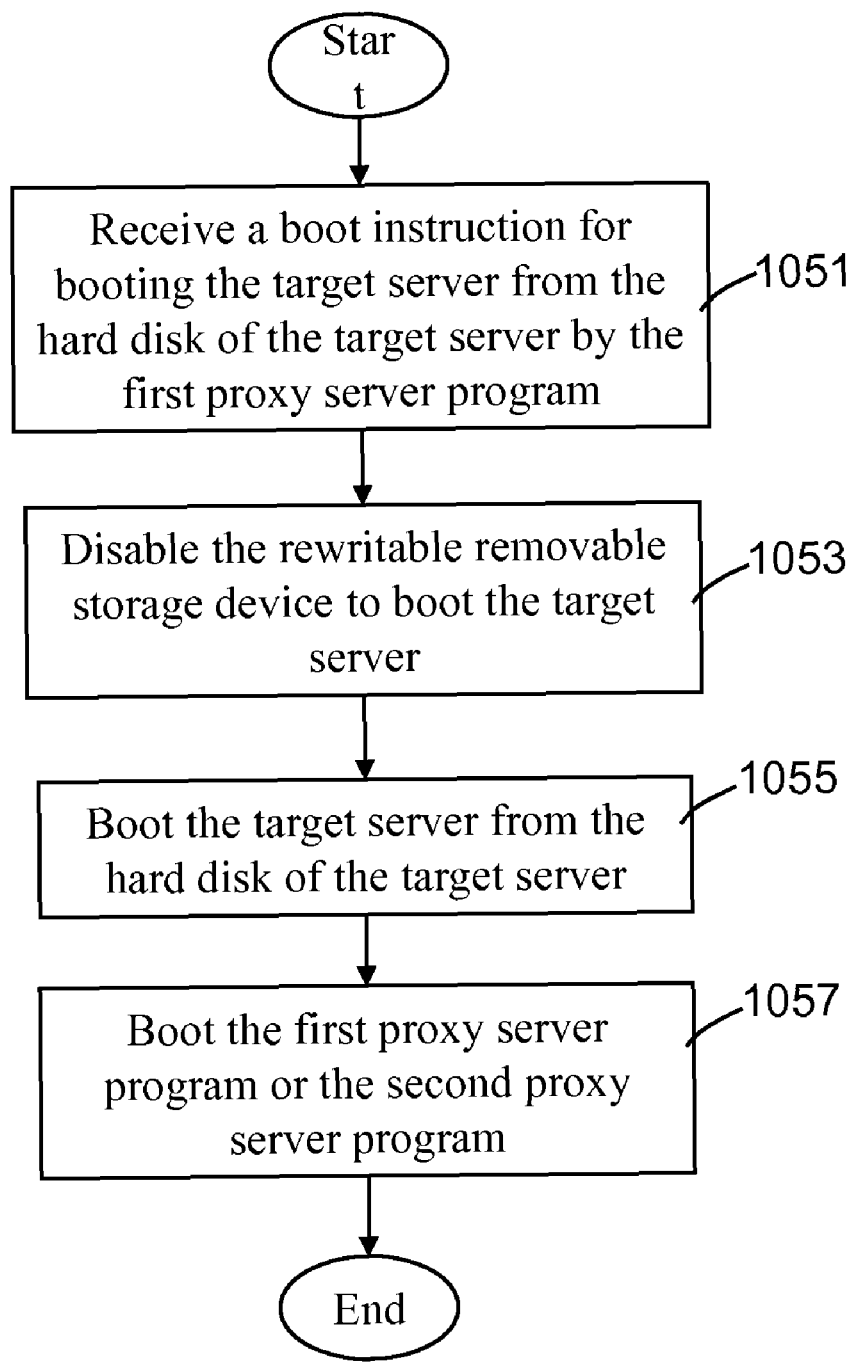
FIG. 2 is a flow chart of booting a target server from a hard disk of the target server in the method for controlling a boot sequence of a server according to the embodiment of the present invention.

FIG. 2 is a flow chart of booting a target server from a hard disk of the target server in the method for controlling a boot sequence of a server according to the embodiment of the present invention.

Referring to FIG. 2, the first proxy server program receives a boot instruction for booting the target server from the hard disk of the target server (Step 1051).

Afterwards, the first proxy server program modifies boot files in the rewritable removable storage device, so that the rewritable removable storage device is disabled to boot the target server (Step 1053).

The boot files in the rewritable removable storage device, such as boot.int or grub configuration file, are used for bootstrap during the booting of the operating system. Therefore, the first proxy server program may modify the boot.int or the grub configuration file, so that the rewritable removable storage device is disabled to boot the operating system of the target server, and thus, the BIOS of the target server successively searches for the next boot point (i.e., the hard disk of the target server) to boot the target server when the target server is booted next time.

Next, the operating system of the target server is booted from the hard disk of the target server (Step 1055).

After the target server is booted from the hard disk, the first proxy server program or the second proxy server program further needs to be booted (Step 1057), so as to maintain the target server under the management and control of the management server all the time, thereby adjusting the boot sequence of the target server at any time according to the actual requirements.

Herein, persons skilled in the art should understand that, once the rewritable removable storage device storing the boot image is removed, the target server obtains an independent management right. In other words, once the rewritable removable storage device is removed, the target server can be directly booted from the hard disk.

Figure 3:
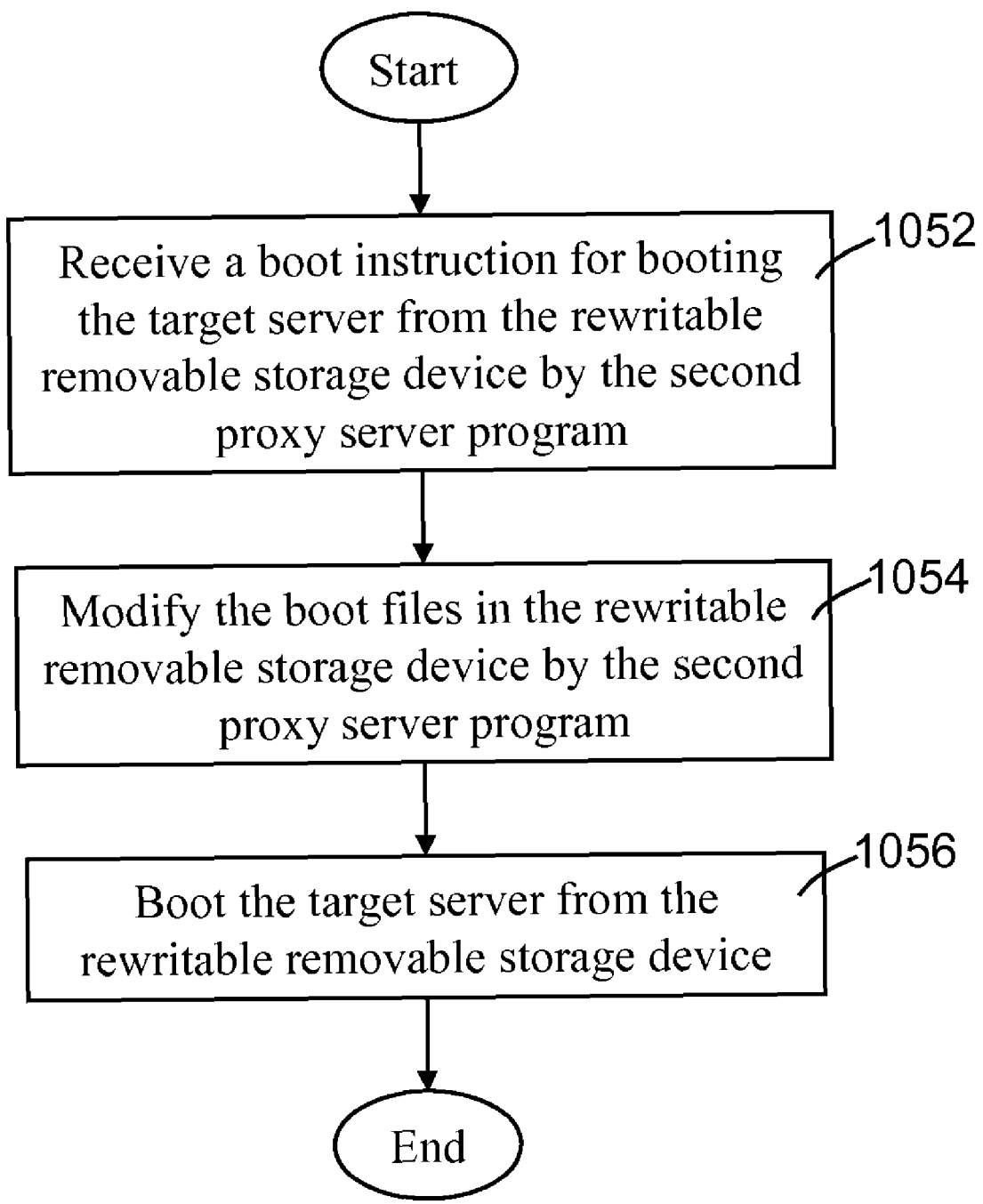
FIG. 3 is a flow chart of booting a target server from a rewritable removable storage device in the method for controlling a boot sequence of a server according to the embodiment of the present invention.

FIG. 3 is a flow chart of booting a target server from a rewritable removable storage device in the method for controlling a boot sequence of a server according to the embodiment of the present invention.

Referring to FIG. 3, the second proxy server program receives a boot instruction for booting the target server from the rewritable removable storage device (Step 1052).

The second proxy server program modifies the boot files in the rewritable removable storage device such as the boot.int or the grub configuration file (Step 1054), so that the rewritable removable storage device is enabled to boot the target server.

Afterwards, the target server is booted from the rewritable removable storage device (Step 1056).

In view of the above, persons skilled in the art should understand that, as a novel server management method, the method for controlling a boot sequence of a server in the embodiment of the present invention has the following advantages. Firstly, as for the hardware configuration, the method for controlling a boot sequence of a server of the present invention merely needs a rewritable removable storage device, without any other hardware, thereby reducing the cost. Secondly, the method of the present invention does not need to modify the hardware and the operating system of the target server, so that the method of the present invention is highly reliable. Thirdly, the method of the present invention is much simpler and more convenient, as compared with various conventional methods.

What is claimed is:

1. A method for controlling a boot sequence of a server, suitable for a management server to control a boot sequence of a target server through a rewritable removable storage device, comprising:
    creating a boot image for booting an operating system of the target server, and placing a first proxy server program into the boot image, wherein the first proxy server program is used to communicate with the management server;
    restoring the boot image containing the first proxy server program on a rewritable removable storage device, so that the rewritable removable storage device is enabled to boot the target server;
    installing and executing a second proxy server program in an operating system of the target server booted from a hard disk, wherein the second proxy server program is used to communicate with the management server;
    setting a basic input/output system (BIOS) of the target server, wherein the target server selects to be booted from the rewritable removable storage device first, and if the booting operation from the rewritable removable storage device fails, the target server is then booted from a hard disk thereof; and
    receiving a boot instruction from the management server by the first proxy server program or the second proxy server program, so as to select to boot the target server from the rewritable removable storage device or from the hard disk of the target server when the target server is booted next time.

2. The method for controlling a boot sequence of a server according to claim 1, wherein when the first proxy server program receives a boot instruction for booting the target server from the hard disk of the target server, the first proxy server program modifies boot files in the rewritable removable storage device, so that the rewritable removable storage device is disabled to boot the target server.

3. The method for controlling a boot sequence of a server according to claim 2, wherein when the second proxy server program receives a boot instruction for booting the target server from the rewritable removable storage device, the second proxy server program modifies boot files in the rewritable removable storage device, so that the rewritable removable storage device is enabled to boot the target server.

4. The method for controlling a boot sequence of a server according to claim 1, wherein after the step of booting the target server from the hard disk of the target server, the method further comprises booting the first proxy server program or the second proxy server program.

5. The method for controlling a boot sequence of a server according to claim 1, wherein the first proxy server program is booted together with the boot image.

6. The method for controlling a boot sequence of a server according to claim 1, wherein the first proxy server program and the second proxy server program directly communicate with the management server, or communicate with the management server after an IP address of the management server is input.

7. The method for controlling a boot sequence of a server according to claim 1, wherein the rewritable removable storage device is any one selected from a group consisting of a rewritable optical disk, a rewritable digital video disk (DVD), and a universal serial bus (USB) flash device.

* * * * *